United States Patent

Zingel et al.

[11] Patent Number: 5,839,963
[45] Date of Patent: Nov. 24, 1998

[54] PLAY APPARATUS FOR CHILDREN'S PLAYGROUNDS OR THE LIKE

[75] Inventors: Hans-Walter Zingel, Mogendorf; Manfred Plugge, Finnentrop, both of Germany

[73] Assignees: ABC-Team Spielplatzgeräte GmbH, Ransbach-Baumbach; Thema-Federn GmbH & Co. KG, Finnentrop, both of Germany

[21] Appl. No.: 921,989

[22] Filed: Aug. 28, 1997

[30] Foreign Application Priority Data

Aug. 29, 1996 [DE] Germany ............... 196 34 945.1

[51] Int. Cl.⁶ .................................................. A63G 13/08
[52] U.S. Cl. ........................ 472/104; 472/135; 482/77; 267/178
[58] Field of Search ............... 472/135, 95, 103, 472/104, 100; 267/177–178, 179, 287, 175; 248/264; 482/87, 90, 83, 77

[56] References Cited

U.S. PATENT DOCUMENTS

| | | | |
|---|---|---|---|
| 2,996,295 | 8/1961 | Smith | 267/178 |
| 3,110,464 | 11/1963 | Baratoff et al. | 267/178 |
| 3,494,613 | 2/1970 | Hatfield | 267/178 |
| 4,728,087 | 3/1988 | Wils | 267/178 |
| 4,962,834 | 10/1990 | Miner | 267/179 |
| 5,522,772 | 6/1996 | Chenard et al. | 472/107 |
| 5,580,315 | 12/1996 | Katz | 267/179 |
| 5,692,737 | 12/1997 | Perlsweig | 267/168 |
| 5,722,645 | 3/1998 | Reitter | 267/177 |

*Primary Examiner*—Jerome Donnelly
*Attorney, Agent, or Firm*—Friedrich Kueffner

[57] ABSTRACT

A play apparatus for children's playgrounds or the like includes a helical spring one end of which is perpendicularly secured to a firm base or ground, and a support member with a seat and a grip is attached to the other end of the helical spring. A base plate is mounted between the base and the helical spring and/or between the support member and the helical spring, wherein the base plate has two grooves with a sector-shaped cross-section corresponding to the cross-section of the helical spring, the grooves being arranged offset and spaced from each other on the level of half of the inclination of the helical spring. A clamping plate which can be clamped against the base plate and also has two grooves corresponding to and arranged opposite of the grooves of the base plate can be clamped against the base plate. The free end of the helical spring is clampable essentially without deformation into the grooves between the base plate and the clamping plate.

8 Claims, 1 Drawing Sheet

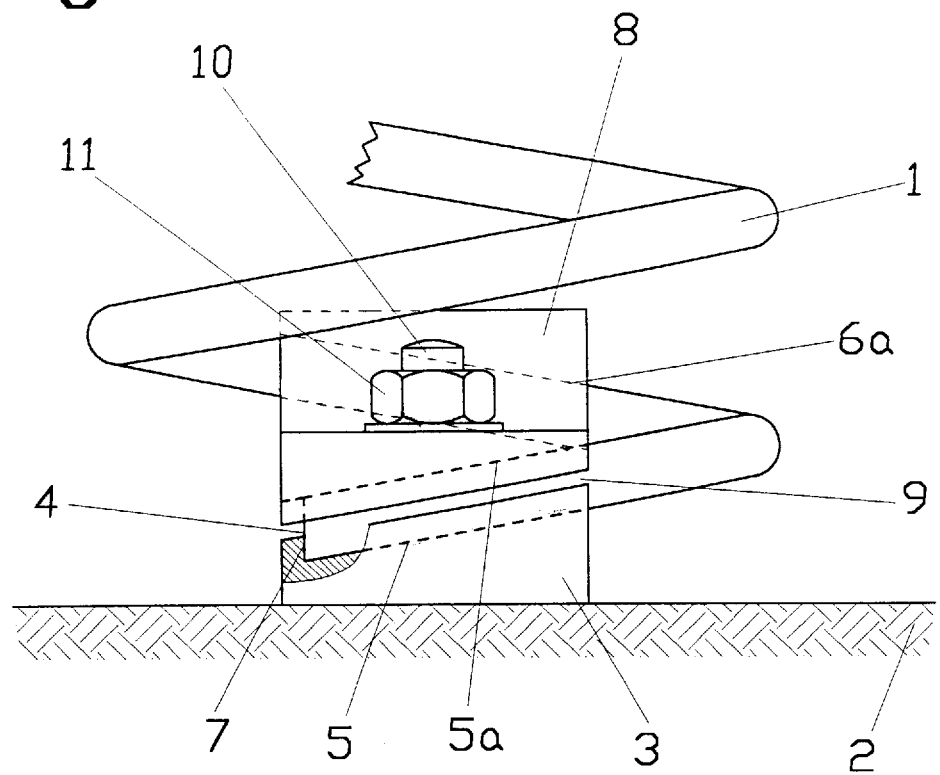
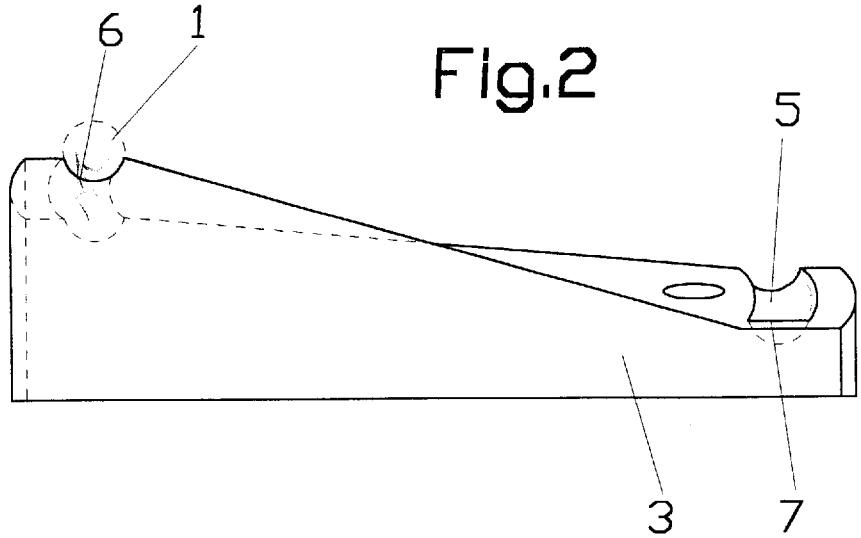

PLAY APPARATUS FOR CHILDREN'S PLAYGROUNDS OR THE LIKE

BACKGROUND OF THE INVENTION

1. Field of the Invention

The present invention relates to a play apparatus for children's playgrounds or the like. The apparatus includes a helical spring one end of which is perpendicularly secured to a firm base or ground, and a support member with a seat and a grip is attached to the other end of the helical spring.

2. Description of the Related Art

Play apparatuses for children's playgrounds are known, wherein these apparatuses may also be called swing apparatus, seesaw apparatus or spring apparatus. The apparatus includes at least one helical spring secured perpendicularly to a firm base. For fastening the helical spring to the base, various stirrups and clamps with intermediate pieces are used which have the purpose of ensuring that the helical spring cannot be deformed even under the most extreme load in such a way that hands or fingers of children are caught in the helical spring. Mounted at the upper end of the helical spring is a support member which may be constructed as an animal, a car or the like, and which includes a seat and a grip. Children can carry out swinging or tilting movements on this support member. For the connection of the helical spring to the support member, stirrups and clamps, also with intermediate pieces as already mentioned above, are used in order to prevent hands or fingers from being caught in the connection.

In all helical springs used for such play apparatus in the past, the helical spring is formed by bending the end of the spring against the last turn of the spring and to grind the end to be planar, so that the spring has at both ends a planar contact surface which extends perpendicularly of the spring axis. This processing of the helical spring is relatively cumbersome and expensive. By bending the end of the helical spring, additional material is required. The stirrups and clamps and possibly the intermediate pieces mentioned above, require a complicated and time-consuming assembly.

SUMMARY OF THE INVENTION

Therefore, it is the primary object of the present invention to provide a play apparatus for children's playgrounds or the like in which the helical spring used can be manufactured less expensively and can be mounted more easily. Moreover, with a given spring characteristic, the properties of the spring are to be improved.

In accordance with the present invention, in a play apparatus of the above-described type, a base plate is mounted between the base and the helical spring and/or between the support member and the helical spring, wherein the base plate has two grooves with a sector-shaped cross-section corresponding to the cross-section of the helical spring, the grooves being arranged offset and spaced from each other on the level of half of the inclination of the helical spring. A clamping plate which also has two grooves corresponding to and arranged opposite of the grooves of the base plate can be clamped against the base plate. The free end of the helical spring is clampable essentially without deformation into the grooves between the base plate and the clamping plate.

As a result of the configuration according to the present invention, the previously necessary processing of the helical spring is no longer required, which makes the helical spring less expensive. The helical spring now has improved spring properties and at least one fewer winding, which means that material is saved and that the manufacture of the spring is less expensive. The assembly of the play apparatus is simplified and can be carried out within a shorter period of time. In addition, it is basically possible to preassemble the helical spring with the base plate and the clamping plate.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 1 is a side view of a portion of the play apparatus according to the present invention mounted on a base; and FIG. 2 is an elevational view of a base plate.

DESCRIPTION OF THE PREFERRED EMBODIMENTS

FIG. 1 of the drawing shows only the lower portion of a helical spring 1 which is part of a known play apparatus in the form of a swing apparatus, seesaw apparatus or spring apparatus. The lower portion of the helical spring 1 is attached to a firm base 2. The other or upper end of the helical spring 1 has mounted on it a support member, for example, constructed as an animal, with a seat and a grip, wherein the support member may be connected in the same manner to the helical spring 1 as the helical spring 1 is connected to the base 2.

A base plate 3 is placed on the base 2. The base plate 3 may be manufactured, for example, of fiber-reinforced synthetic material, for example polyamide. The portion of fibers, for example, glass fibers, may be about 15% to 30% by weight and the length of the fibers is approximately between 2 and 20 mm. The base plate 3 usually has a planar bottom side which is fully in contact with the base 2. The upper side of the base plate 3 is initially inclined and extends helically. The two end portions of the base plate 3 are inclined at an oppositely directed angle, wherein this angle corresponds exactly to the angle of the inclination of the helical spring 1, as can be clearly seen in FIGS. 1 and 2 of the drawing.

The helical spring 1 has over its entire length a constant inclination, i.e., the ends of the helical spring 1 have not been bent against the last winding and were not ground so as to be planar, so that the helical spring 1 does not have a planar contact surface extending perpendicularly of the axis of the helical spring 1. The helical spring 1 has only been cut at both its ends, wherein the drawing only shows the lower end, at an angle approximately perpendicularly to the axis of the winding, so that the end face 4 is formed which can be seen in FIG. 1.

The helical spring 1, which does not have any specially formed end portions as mentioned above, is now placed in appropriately arranged grooves 5, 6 of the base plate 3, wherein the grooves 5, 6 have a sector-shaped cross-section and are formed at two oppositely located end portions of the base plate 3. The cross section of the grooves 5, 6 corresponds exactly to the partial cross-section of the helical spring 1, so that the helical spring 1 can be placed without being visibly deformed into the grooves 5, 6. While the groove 6 extends over the entire width of the base plate 3, the groove 5 is at its lowermost point provided with a stop 7 formed by a wall, wherein, as can be seen in FIG. 1, the free end face of the end of the helical spring 1 contacts the stop 7.

As soon as the helical spring 1 has assumed the position described above in the grooves 5, 6 of the base plate 3, a clamping plate 8 is placed on top of the base plate 3, wherein the surface of the clamping plate 8 facing the base plate 3 is constructed in the same way as the upper surface of the base plate 3 and, thus, is congruent with the upper surface of the base plate 3. This means that the clamping plate also has grooves 5a, 6a having a sector-shaped cross-section, which are only schematically shown in FIG. 1. In contrast to the base plate 3, the groove 5a of the clamping plate 8 is continuous, i.e., no stop is provided which would correspond to the stop 7 at the end of the groove 5 of the base plate 3. However, if necessary, such a stop can also be provided in the clamping plate. In addition, it is possible to omit the stop 7 in the groove 5 and to provide an appropriate stop in the groove 5a.

The clamping plate 8 is now placed on the base plate 3 in such a way that the winding of the helical spring 1 is in engagement in the grooves 5a, 6a. In this engaged position, as can be seen in FIG. 1, a gap 9 exists between the base plate 3 and the clamping plate 8. This gap 9 makes it possible to tightly clamp the clamping plate 8 against the base plate 3, so that the helical spring 1 can be clamped and tightly secured between the base plate 3 and the clamping plate 8, i.e., in the grooves 5, 5a and 6, 6a, respectively, as can be seen in FIG. 1. As a result, the position of the helical spring 1 is immovably secured. The base plate 3 can be tightly clamped to the clamping plate 8 by means of a screw 10 with a nut 11 arranged adjacent the grooves 5, 5a and 6, 6a. For clarity's sake, only one screw 10 with nut 11 is shown in FIG. 1 of the drawing. If required, the screw 10 only connects the clamping plate 8 to the base plate 3. This means that the base plate 3 must be secured to the base 2 by means of separate fastening means. However, it is also possible to secure the screws 10 in the base 2, so that the screws 10 serve for tightly connecting the clamping plate 8 and the base plate 3 as well as for fastening the base plate 3 and, thus, the helical spring 1 to the base 2. If necessary, the base plate 3 may also have threaded bores into which appropriate screws 10 can be screwed for securing the clamping plate 8 to the base plate 3 and, thus, for fastening the helical spring 1.

In accordance with another development of the present invention, the base plate and the clamping plate 8 may also be of a different material, for example, steel or aluminum.

While specific embodiments of the invention have been shown and described in detail to illustrate the inventive principles, it will be understood that the invention may be embodied otherwise without departing from such principles.

We claim:

1. A play apparatus for children's playgrounds or the like, the apparatus comprising a helical spring having a cross-section, an inclination and first and second ends, the first end of the helical spring being perpendicularly secured to a firm base, a support member adapted to support a user thereon being attached to the second end of the helical spring, a base plate being mounted at least one of between the first end of the helical spring and the base and between the second end of the helical spring and the support member, wherein the base plate has two grooves with a sector-shaped cross-section corresponding to the cross-section of the helical spring, the grooves being arranged offset and spaced from each other on a level of half of the inclination of the helical spring, further comprising a clamping plate mounted so as to be clamped against the base plate, the clamping plate also having two grooves corresponding to and arranged opposite the grooves of the base plate, wherein the end of the helical spring is received essentially without deformation in the grooves between the base plate and the clamping plate.

2. The play apparatus according to claim 1, wherein one of the first and second ends of the helical spring has a free end face, and wherein one of the grooves receiving the helical spring has a stop for the end face.

3. The play apparatus according to claim 2, wherein the stop is provided at least one of in the base plate and the clamping plate.

4. The play apparatus according to claim 3, wherein the stop is constructed integrally with one of the base plate and the clamping plate.

5. The play apparatus according to claim 1, further comprising at least one tightening screw for connecting the clamping plate to the base plate.

6. The play apparatus according to claim 5, wherein the tightening screw additionally attaches the base plate to the base and the base plate to the support member.

7. The play apparatus according to claim 1, wherein at least one of the base plate and the clamping plate is of synthetic material.

8. The play apparatus according to claim 7, wherein the synthetic material is filled with fibers.

* * * * *